April 14, 1942. E. R. RINGMARCK 2,279,640
BAG FILLING APPARATUS
Filed May 24, 1940
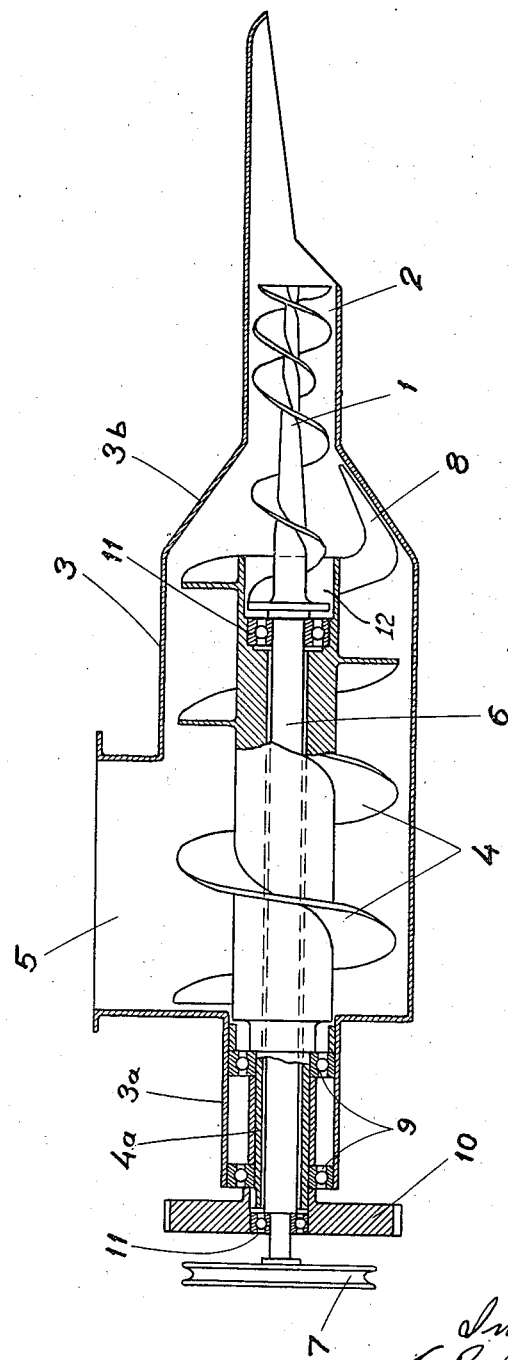
Inventor:
E. R. Ringmarck
By E. F. Wenderoth
Atty Patented Apr. 14, 1942

2,279,640

UNITED STATES PATENT OFFICE 2,279,640

BAG FILLING APPARATUS

Emil Reinhold Ringmarck, Svedala, Sweden

Application May 24, 1940, Serial No. 337,088
In Sweden May 27, 1939

3 Claims. (Cl. 226—48)

This invention relates to apparatus for filling bags, particularly those of the valve type. More particularly the invention relates to valve bag filling apparatus of the kind comprising a screw conveyer for delivering pulverous material, such as flour, into the bag through a nozzle inserted into the bag through the valve opening thereof.

One object of the invention is to increase the filling rate of the apparatus and thus to shorten the period required for filling a bag of given size.

Another object of the invention is to eliminate or reduce the tendency of the screw conveyer to force air into the bag together with the material.

With these and other objects in view, which will appear from the following description, the invention consists in the arrangement, combination and construction of parts hereinafter fully set forth and claimed, reference being had to the accompanying drawing illustrating a preferred form of the invention. The drawing shows the parts of the apparatus partly in elevation, partly in section.

Referring to the drawing, 1 designates a conveyer screw for delivering pulverous material into a valve bag through a nozzle 2 projecting from a casing 3 for a conveyer screw 4. The casing 3 has an opening 5 for receiving the said material from a hopper or the like (not shown). The conveyer screw 4 is provided with a shank shaft 4a journalled in a rear extension 3a of the casing 3 by means of ball bearings 9 and provided at its rear end with a gear wheel 10 adapted to be driven from some suitable driving member (not shown). The conveyer screw 4 and its shank shaft 4a are hollow, and the conveyer screw 1 has a shank shaft 6 which extends through the hollow conveyer screw 4 and shank shaft 4a and gear wheel 10 and is journaled therein by means of ball bearings 11 within the cylindrical recess 12 provided in the screw 4. The rear end of the shaft 6 extends beyond the gear wheel 10 and is provided with a pulley 7 adapted to be driven from some suitable driving member by means of a belt (not shown). As will be seen from the drawing the conveyer screw 1 extends axially from the forward end of the conveyer screw 4 into the nozzle 2. The casing 3 for the conveyer screw 4 has a substantially conical portion 3b merging into the projecting nozzle 2. The forward end of the thread of the screw 4, which extends substantially to the conical portion 3b of the casing 3, is extended to form a scraper blade 8 which works in the conical portion 3b of the casing 3.

The conveyer screw 1 is driven by the aid of the pulley 7 and is designed for a very high working speed. The conveyer screw 4 is driven by the aid of the gear wheel 10 and is designed for a relatively low working speed, the diameter of the screw 4 being materially greater than that of the screw 1.

A batch of material to be filled into a valve bag is delivered to the casing 3 through its opening 5 from a hopper or the like. The relatively slowly rotating conveyer screw 4 conveys the material forwardly to the relatively rapidly rotating conveyer screw 1 which conveys the material out through the nozzle 2 into the bag which has been placed on a suitable support with the nozzle 2 inserted in the bag through the valve opening thereof. When the whole batch of material has been conveyed into the bag the latter is removed from the nozzle 2.

In order to obtain a high filling rate in valve bag filling apparatus of the screw conveyer type the screw conveyer projecting into the filling nozzle for conveying the material out through the nozzle into the bag necessarily must be designed for a very high working speed. In known apparatus of this type the rapidly rotating screw conveyer serves the purpose of conveying the material to the nozzle as well as out through the nozzle, and due to the high working speed of the screw conveyer it then has a tendency to throw the material upwardly in the casing in which the screw conveyer works. Especially towards the end of the filling operation, that is when the last part of the batch of material is to be swept out through the nozzle, this tendency results in that the portion of the screw conveyer extending below the opening in the casing "plays" with the last material therein instead of rapidly conveying it to the nozzle, whereby the portion of the screw conveyer projecting into the nozzle is left to work more or less idly. This prolongs the filling period since the bag cannot be removed from the filling nozzle until the whole of the batch of material has been swept out into the bag. Further there is the drawback that the screw conveyer works with the spaces between its threads only partly filled with material, resulting in that the screw conveyer forces a relatively great amount of air into the bag together with the material. As the bag fills this air is compelled to escape from the bag, and since the air cannot be allowed to blow out through the bag valve opening around the filling nozzle it practically has no other way to escape than through the nozzle in counter-current to the last part of the batch of material to be delivered into the bag by the screw conveyer.

This counter-current of air counter-acts and further prolongs the filling operation. Further, when a substantial amount of air is introduced into the bag together with the material, a relatively great amount of air will remain in the bag, and this is disadvantageous for the reason that there is a greater risk for smashing a filled bag, for instance when dumping it, if it contains a substantial amount of air.

By the present invention the drawbacks above referred to are eliminated or at least materially reduced. Since the conveyer screw 4 works at a relatively low speed it has practically no tendency to throw the material upwardly in the casing 3. The conveyer screw 4 delivers material to the rapidly rotating conveyer screw 1 in sufficient amount for continuously filling the spaces between the threads of the conveyer screw 1 with material practically till the end of the filling operation, so that practically no air will be forced into the bag by the rapidly rotating conveyer screw 1 and so that the latter practically will be given no opportunity of working idly until all the material of the batch has been swept out into the bag. The scraper blade 8 removes any material tending to stick to the wall of the conical portion 3b of the casing 3. Preferably the scraper blade 8 is given such a shape that it works not only as a scraper blade but also aids in conveying the material to the nozzle 2.

The screw 4 as shown in the drawing is constructed as a continuously solid cylindrical wall with the helical blade on the exterior thereof. This wall defines a central bore through which the shaft 6 extends and thereafter the material fed through the inlet 5 is maintained out of contact with the shaft 6.

What I claim and desire to secure by Letters Patent is:

1. A valve bag filling apparatus of the character described, comprising in combination, a casing providing a substantially cylindrical chamber having an inlet opening in its side adjacent one of its ends, and a tapering end portion at its opposite end, a substantially cylindrical nozzle disposed as a continuation of said tapering end portion of said chamber, a rotatable screw in said chamber for feeding material to be filled into a bag from the inlet end of said chamber to said tapering end portion thereof, a second rotatable screw extending axially from said first screw through said tapering end portion of said chamber and into said nozzle for conveying the material from said tapering end portion out through said nozzle, said substantially cylindrical chamber and said first screw being materially greater in diameter than said nozzle and said second screw, means for driving said second screw at a high speed and said first screw at a relatively low speed, said first screw comprising a continuously solid cylindrical wall having a helical blade exteriorly thereof, and defining a central bore, a shaft extending from said second screw and passing through said bore, whereby the material fed through the casing is maintained out of contact with said shaft.

2. A valve bag filling apparatus as claimed in claim 1 in which said first screw has a cylindrical recess having an outer diameter slightly greater than the diameter of said second screw, said second screw being rotatably mounted within said recess.

3. A valve bag filling apparatus as claimed in claim 1 in which said wall extends substantially to said tapering end portion of said chamber and said helical blade is extended beyond said wall to form a scraper working in said tapering end portion of said chamber.

EMIL REINHOLD RINGMARCK.